United States Patent
Kim et al.

(10) Patent No.: US 10,663,757 B2
(45) Date of Patent: May 26, 2020

(54) AUTOSTEREOSCOPIC THREE-DIMENSIONAL IMAGE DISPLAY APPARATUS

(71) Applicant: KOREA INSTITUTE OF SCIENCE AND TECHNOLOGY, Seoul (KR)

(72) Inventors: Sungkyu Kim, Seoul (KR); Kihyuk Yoon, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 108 days.

(21) Appl. No.: 16/174,015

(22) Filed: Oct. 29, 2018

(65) Prior Publication Data

US 2019/0369407 A1  Dec. 5, 2019

(30) Foreign Application Priority Data

May 31, 2018 (KR) .................. 10-2018-0062846

(51) Int. Cl.
  *G02B 27/22*  (2018.01)
  *G02B 30/27*  (2020.01)

(52) U.S. Cl.
  CPC .................. *G02B 30/27* (2020.01)

(58) Field of Classification Search
  CPC .... H04N 13/317; H04N 13/305; H04N 13/31; H04N 13/324; H04N 13/00; H04N 13/302; H04N 13/312; H04N 13/32; H04N 13/351; H04N 13/354; H04N 13/371; H04N 13/373; H04N 13/315; H04N 13/366; H04N 13/368; H04N 13/398; G02B 30/27; G02B 27/60; G02B 30/00; G02B 30/26; G02B 27/0093; G02B 30/29; G02B 30/32
  USPC .................. 359/462–477, 376–378
  See application file for complete search history.

(56) References Cited

U.S. PATENT DOCUMENTS

2014/0340746 A1* 11/2014 Watanabe .............. G09G 3/003
  359/464
2017/0208319 A1*  7/2017 Kim ..................... H04N 13/305

FOREIGN PATENT DOCUMENTS

KR  10-2015-0079146 A  7/2015
KR  10-2016-0005937 A  1/2016
KR  10-2017-0042050 A  4/2017

OTHER PUBLICATIONS

Dong Hyun Cho et al., "Pixel Mapping of Autostereoscopic 3D Image Display Using Ray Tracing", Korea University Master of Degree Thesis, Jun. 30, 2015.
Korean Office Action dated Jul. 24, 2019.

* cited by examiner

*Primary Examiner* — Brandi N Thomas
(74) *Attorney, Agent, or Firm* — Rabin & Berdo, P.C.

(57) ABSTRACT

Provided is an autostereoscopic three-dimensional image display apparatus. The autostereoscopic three-dimensional image display apparatus includes a display panel including an array of a plurality of sub-pixels, and an optical plate or a line light source, which is spaced a predetermined interval from the display panel at a predetermined inclination angle, wherein an inclination angle of the optical plate or the line light source with respect to a vertical direction of the display panel is determined by an equation.

7 Claims, 15 Drawing Sheets

(a) Z = 1300 mm (OVD POSITION)

AUTOSTEREOSCOPIC THREE-DIMENSIONAL IMAGE DISPLAY APPARATUS

CROSS-REFERENCE TO RELATED APPLICATION

This application claims priority to and the benefit of Korean Patent Application No. 2018-0062846, filed on May 31, 2018, the disclosure of which is incorporated herein by reference in its entirety.

BACKGROUND

1. Field of the Invention

The present invention relates to an autostereoscopic three-dimensional image display apparatus for providing a three-dimensional image, and more particularly, to an autostereoscopic three-dimensional image display apparatus to which a method of designing a sub-pixel based viewing zone is applied.

2. Discussion of Related Art

In a general autostereoscopic three-dimensional (3D) image display apparatus, a viewing zone is divided using an optical plate such as a lenticular lens, a parallax barrier, or the like. In this case, a viewer at a viewing position sees an image at each corresponding viewpoint with a left eye and a right eye. As a result, the viewer can see the image as a 3D image.

FIG. 1 is a conceptual view of a multi-viewpoint 3D image display apparatus according to the related art to which a general parallax barrier is applied. FIG. 2 is a set of front views for describing types of parallax barriers in the multi-viewpoint 3D image display apparatus according to the related art, where FIG. 2A shows a case in which a vertical parallax barrier is applied to the multi-viewpoint 3D image display apparatus and FIG. 2B shows a case in which an inclined parallax barrier is applied to the multi-viewpoint 3D image display apparatus.

A plurality of pixels are arranged on a display panel of the multi-viewpoint 3D image display apparatus to which the general parallax barrier is applied as shown in FIGS. 1 and 2. Here, a single pixel includes RGB sub-pixels in a horizontal direction. As shown in FIGS. 1 and 2, single pixels are arranged in a form of a matrix in horizontal and vertical directions.

Referring to FIG. 1, to implement a 3D image, a parallax barrier is disposed in front of the display panel on which the single pixels are arranged. Alternatively, a lenticular lens instead of the parallax barrier may be disposed as a parallax separating means, and line light sources arranged on a rear surface of the display panel at regular intervals may be used.

A common viewing zone according to the number of designed viewpoints at an optimum viewing distance (OVD) position is implemented by an optical plate which is designed according to sizes of the pixels of the display panel and the number of viewpoints. FIG. 1 shows an example in which a common viewing zone is formed according to a design of six viewpoints. However, in such a general multi-viewpoint 3D image display apparatus, an amount of crosstalk varies according to horizontal position movement (position movement in parallel with the display panel) of the viewer.

In a case of the autostereoscopic 3D image display apparatus in which a vertical parallax separating means is applied to a general flat display panel having an RGB stripe-type pixel structure as shown in FIG. 2A, there is an advantage in that the amount of crosstalk between adjacent viewing zones is small. However, there is a disadvantage in that it is difficult to implement a 3D image of a proper color because viewing zones formed in the horizontal direction are chromatically dispersed. For example, referring to FIG. 2A, it can be seen that third viewing zones are formed only in a blue color. In addition, there is a problem in that it is difficult to implement a 3D image with an appropriate ratio of a horizontal resolution to a vertical resolution because a resolution decreases only in the horizontal direction due to an increase in the number of viewpoints.

FIG. 2B shows a case in which an inclined parallax barrier having an inclination angle of 18.43 degrees ($\arctan(1/3)$) is applied to the 3D image display apparatus. When the inclined parallax barrier is used in this manner, the above-described problems occurring in using the vertical parallax barrier may be addressed. That is, referring to FIG. 2B, since third viewing zones are composed of RGB colors, a chromatic dispersion problem occurring in each viewing zone may be addressed. In addition, a degradation of a resolution of the 3D image due to an increase in the number of viewpoints may be dispersed in the horizontal and vertical directions. However, when the inclined parallax barrier is used in this manner, there is a problem in that the amount of crosstalk is increased between adjacent viewing zones. In addition, bright and dark stripes (a moiré phenomenon) are displayed on a screen in the 3D image display apparatus when a position of the viewer is out of the OVD position, and thus a viewing range capable of viewing an optimal 3D image is limited.

Hereinafter, a shape of viewing zones formed at the OVD position and the above problems will be described in more detail with reference to FIGS. 3 and 4.

FIG. 3 is a graph showing chromatic dispersion and the shape of the viewing zones formed at the OVD position in the 3D image display apparatus to which the vertical parallax barrier is applied as shown in FIG. 2A. Referring to FIG. 3, it can be seen that images of adjacent viewing zones do not ideally overlap each other at a center of each of the viewing zones when the vertical parallax barrier is applied to the 3D image display apparatus. That is, in an ideal case, point crosstalk becomes zero. For example, in FIG. 3, crosstalk is zero at a center (a position of a left vertical dotted line) of each of sixth viewing zone. However, when the center of the viewing zone is out of range, crosstalk with an adjacent viewing zone may be significantly increased and brightness in the viewing zone may not be uniform. For example, maximum crosstalk occurs at a point at which two adjacent viewing zones meet. In addition, when the vertical parallax barrier is applied to the 3D image display apparatus, it can be seen that an effect of RGB chromatic dispersion is exhibited in the horizontal direction. This means that it is difficult to implement an appropriate color of the 3D image.

FIG. 4 is a graph showing the shape of the viewing zones formed at the OVD position in the 3D image display apparatus to which the inclined parallax barrier is applied as shown in FIG. 2B. Referring to FIG. 4, it can be seen that point crosstalk becomes greater than zero even in an ideal case (a central positon of each viewpoint). For example, crosstalk is also present at a position of a right vertical dotted line, which is a central position of a second viewing zone. Further, when the inclined parallax barrier is applied to the 3D image display apparatus, the chromatic dispersion problem is addressed because RGB color pixels are formed in an inclination direction. However, a moiré phenomenon occurs in a depth direction deviating from the OVD position.

FIG. 5 is a set of views for describing a moiré phenomenon occurring in the 3D image display apparatus according to the related art to which the inclined parallax barrier is applied. Specifically, FIG. 5 is a set of photographs of the moiré phenomenon occurring in a case in which an inclination angle of the parallax barrier is 18.43 degrees (arcTan (⅓)), where FIG. 5A shows a case of 1,300 mm in a depth direction (Z) (an OVD position) and FIG. 5B shows a case of 2,500 mm in the depth direction (Z). The moiré phenomenon is caused by a geometrical interference effect between the parallax barrier and lattices of the pixels of the display panel. Referring to FIG. 5B, black lines are displayed in the inclination direction at regular intervals. In general, the moiré effect does not occur largely at the OVD position (in the case of FIG. 5A). However, when the viewer moves in the depth direction, the viewer may view a moiré image pattern having a different period according to a moving distance (in the case of FIG. 5B). However, even when the viewer deviates from a designed OVD position and moves in the depth direction, the viewer may view a full white image in which the moiré phenomenon is minimized like at the OVD position, at a specific inclination angle smaller than the arcTan (⅓).

In Korean Patent Application No. 10-2015-0079146, a technique for realizing a autostereoscopic 3D display in which a viewing zone is designed for each data line using an RGB stripe-type display panel, an inter-viewing zone is formed according to an inclination angle of an optical plate to provide a natural motion parallax, and the moiré phenomenon is minimized is disclosed. However, there is a limitation in a degree of freedom of an inclination angle of the optical plate or the line light source due to the design of the pixel based viewing zone. Therefore, a display panel capable of realizing an optimal autostereoscopic 3D display should be selected, and quality of a 3D image with a large parallax may be degraded due to a chromatic dispersion characteristic when the inclination angle is not a multiple of 3.

In Korean Patent Application No. 10-2016-0005937, a technique for realizing a method of improving a characteristic of a viewing zone and quality of a 3D image using a display panel to which the RGB structure is applied for each data line is disclosed. However, there is a problem in that a display panel having a special pixel structure is required.

In such techniques in the related art, the degree of freedom of the inclination angle of the optical plate (the parallax barrier or the lenticular lens) by arranging viewpoints in pixel units is limited, and thus it is difficult to design the viewing zone in consideration of an inclination condition in which the moiré phenomenon generated between the display panel and the optical plate by a geometrical arrangement is minimized. Further, when an interval between the viewpoints of the viewing zones formed to minimize the degradation of a resolution and enlarge a regular viewing zone range is increased, a viewer sees a discontinuous 3D image when the viewer moves left and right, and a parallax according to the viewpoint is increased, and thus there is a limitation in expressing a stereoscopic depth of the 3D image due to crosstalk between adjacent viewing zones. In addition, according to the techniques in the related arts, even when the same viewing zone is designed, since the inclination angle of the optical plate (the parallax barrier or the lenticular lens) in which the moiré phenomenon is minimized is sensitively changed according to a structure of the display panel, the change of the structure of the display panel should be considered. Therefore, it is difficult to design the viewing zone. That is, it is difficult to commercialize the autostereoscopic 3D display apparatus due to the above described limitations of the 3D display panel.

DOCUMENT OF RELATED ART

Patent Document (Patent Document 1) Korean Unexamined Patent Application No. 10-2015-0079146
(Patent Document 2) Korean Unexamined Patent Application No. 10-2016-0005937

SUMMARY OF THE INVENTION

The present invention is directed to providing an autostereoscopic three-dimensional (3D) image display apparatus in which a limitation of a design of a viewing zone of a 3D display is relieved, a 3D display panel in which a moiré phenomenon is minimized is designed, and an autostereoscopic 3D display panel is commercialized.

The present invention is also directed to providing a autostereoscopic 3D image display apparatus in which a viewing zone is designed based on sub-pixels of a display panel so that a viewing zone is freely designed even when a pixel structure of a display panel is changed, and a degree of freedom, capable of applying various angles of an optical plate in which a moiré phenomenon is minimized, is increased.

According to an aspect of the present invention, there is provided a autostereoscopic 3D image display apparatus including a display panel including an array of a plurality of sub-pixels, and an optical plate or a line light source, which is spaced a predetermined interval from the display panel at a predetermined inclination angle, wherein an inclination angle of the optical plate or the line light source with respect to a vertical direction of the display panel is determined by the following [Equation]:

$$\theta = \tan^{-1}\left[\frac{W_h}{W_v}\frac{m}{n}\right] \quad \text{[Equation]}$$

here, θ denotes the inclination angle, $W_h$ denotes a horizontal size of each of the sub-pixels constituting the display panel, $W_v$ denotes a vertical size of each of the sub-pixels, n denotes the number of vertical sub-pixels, to which viewpoint images are distributed, among the sub-pixels constituting the display panel, which is an integer of 2 or more and is smaller than the number of the vertical sub-pixels of the display panel, and m denotes the number of horizontal sub-pixels, to which the viewpoint images are distributed, in one period among the sub-pixels constituting the display panel, which is an integer of 1 or more and is smaller than n.

Preferably, the autostereoscopic 3D image display apparatus may further include a controller configured to generate a 3D image by arranging the viewpoint images on the display panel.

Preferably, a distance between adjacent viewpoint images among the viewpoint images may be 65 mm or less.

Preferably, the controller may determine a viewpoint image to be arranged in the sub-pixel according to the following [Equation] when the inclination angle is greater than 0 degrees:

$$X[i,j]=1+n\times(j-1)-m\times(i-1), \text{ and} \quad \text{[Equation]}$$

determine a viewpoint image to be arranged in the sub-pixel according to the following [Equation] when the inclination angle is smaller than 0 degrees:

$$X[i,j]=1+n\times(j-1)+m\times(i-1) \quad \text{[Equation]}$$

here, X[i,j] denotes a viewpoint image assigned in a sub-pixel in $i^{th}$ row and $j^{th}$ column.

Preferably, the controller may determine a final viewpoint number to be assigned in the sub-pixel by adjusting the determined viewpoint image, wherein the final viewpoint number may be determined by the following [Equation] when the determined viewpoint image is 1 or more and is a total number of viewpoints or less:

$$VP[i,j]=X[i,j] \quad \text{[Equation]}$$

the final viewpoint number may be determined by the following [Equation] when the determined viewpoint image is greater than the total number of viewpoints:

$$VP[i,j]=X[i,j]-l\times C, \text{ and} \quad \text{[Equation]}$$

the final viewpoint number may be determined by the following [Equation] when the determined viewpoint image is smaller than 1:

$$VP[i,j]=X[i,j]+l\times C \quad \text{[Equation]}$$

here, VP[i,j] denotes a final viewpoint number assigned to the sub-pixel in $i^{th}$ row and $j^{th}$ column, X[i,j] denotes an index value for generating the viewpoint number assigned to the sub-pixel in $i^{th}$ row and $j^{th}$ column, C denotes the total number of viewpoints at which the viewpoint image is arranged, and 1 is a positive integer selected to satisfy a condition of 1≤VP[i,j]≤C.

Preferably, the controller may arrange the same viewpoint image at a predetermined number of adjacent viewpoints when the number of viewpoints increases by adjusting the inclination angle of the optical plate or the line light source.

Preferably, the optical plate may include a parallax barrier or a lenticular lens.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIGS. 7 to 9 are views showing designs of viewpoints according to an inclination angle of an optical plate in designs of viewing zones having a pixel structure according to the related art;

FIGS. 11 and 12 are views showing designs of viewpoints according to an inclination angle of an optical plate in designs of sub-pixel based viewing zones according to an embodiment of the present invention;

FIG. 13 is a view showing designs of viewpoints in which the same viewpoints are distributed to three adjacent viewpoints in the designs of the sub-pixel based viewing zones according to the embodiment of the present invention in FIG. 12.

DETAILED DESCRIPTION OF EXEMPLARY EMBODIMENTS

Figure 1:
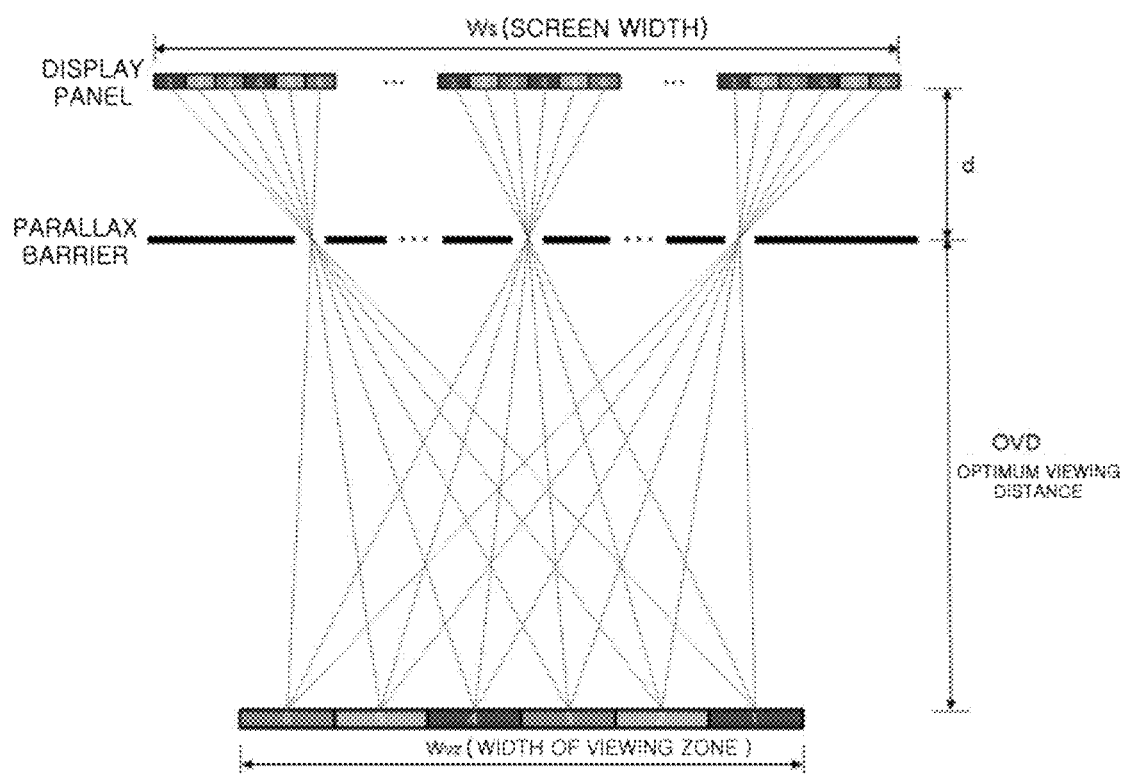
FIG. 1 is a conceptual view of a multi-viewpoint three-dimensional (3D) image display apparatus according to the related art to which a general parallax barrier is applied.
Figure 2:
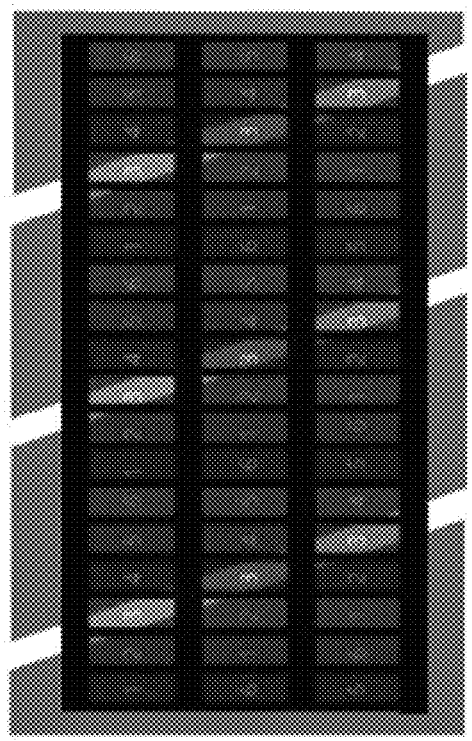
FIG. 2 is a set of front views for describing types of parallax barriers in the multi-viewpoint 3D image display apparatus according to the related art.
Figure 2:
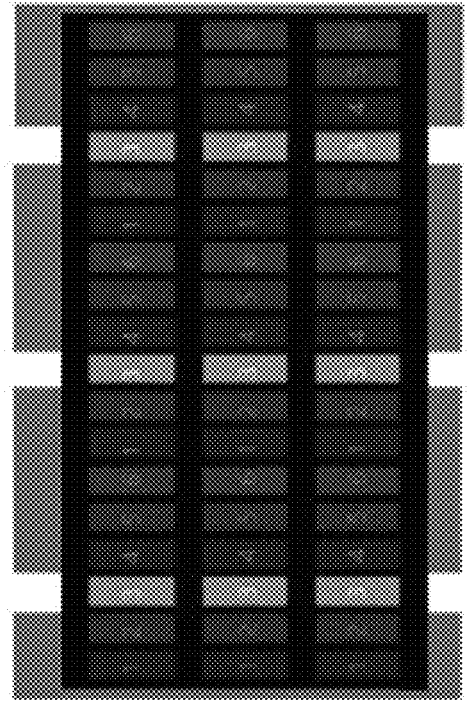
Figure 3:
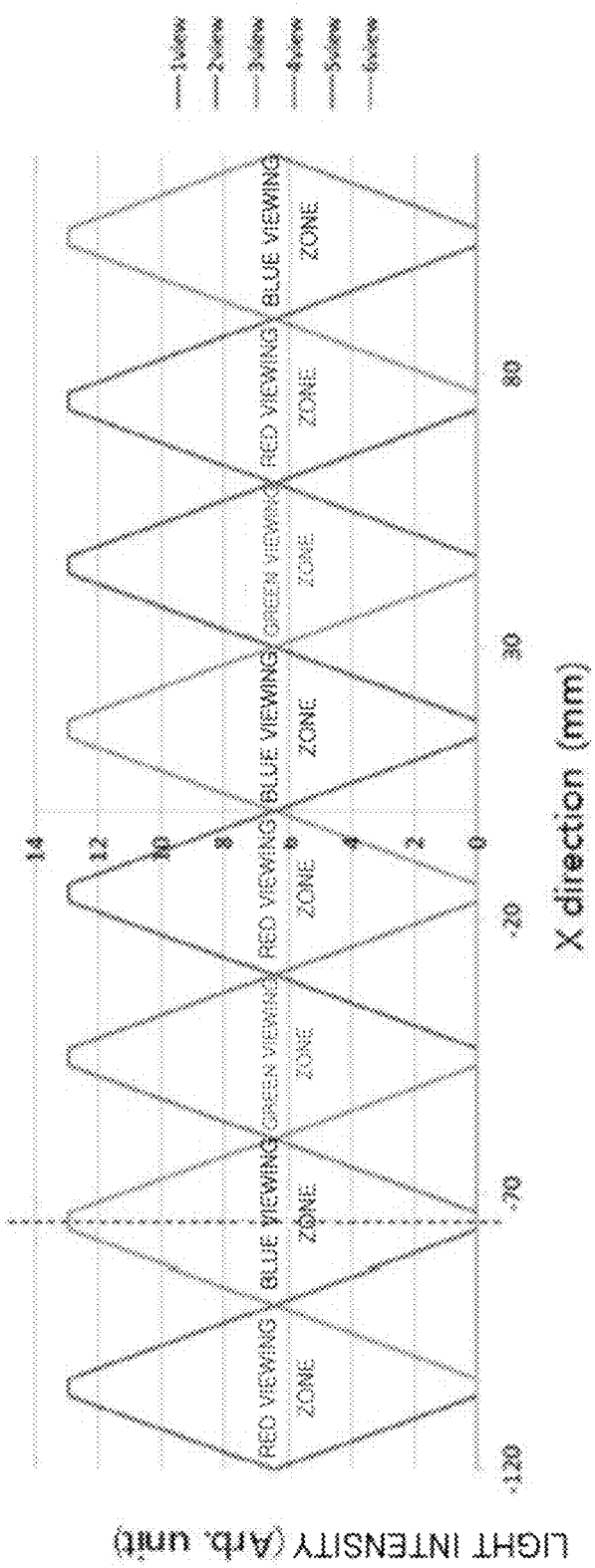
FIG. 3 is a graph showing chromatic dispersion and shapes of viewing zones formed at an optimum viewing distance (OVD) position in the 3D image display apparatus shown in FIG. 2A to which a vertical parallax barrier is applied.
Figure 4:
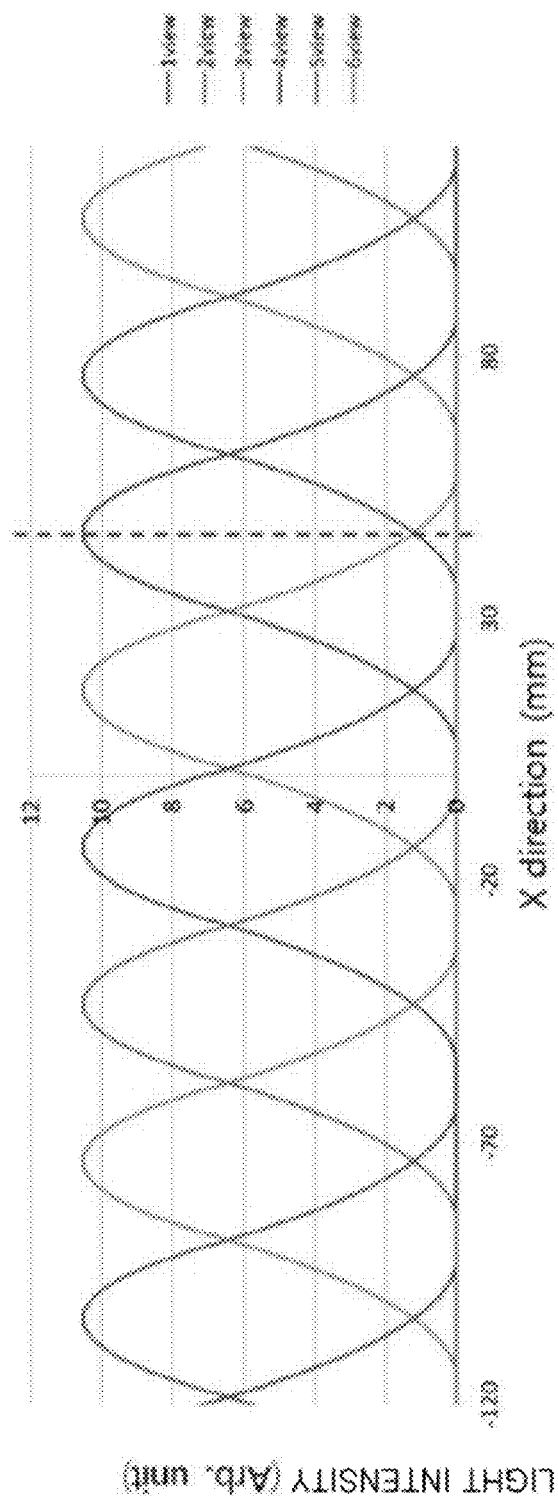
FIG. 4 is a graph showing shapes of viewing zones formed at an OVD position in the 3D image display apparatus shown in FIG. 2B to which an inclined parallax barrier is applied.
Figure 5:
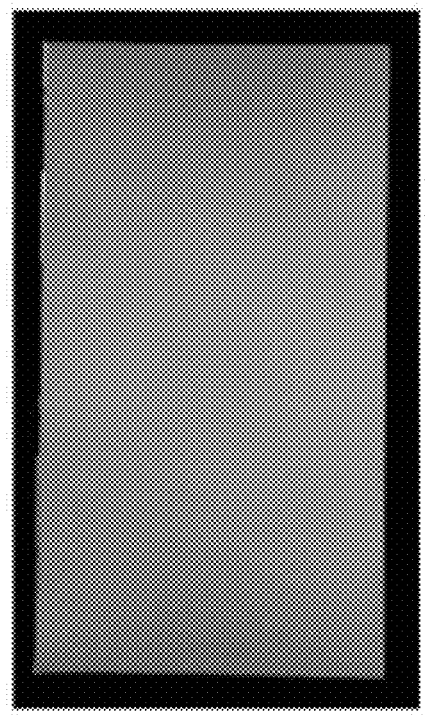
FIG. 5 is a set of views for describing a moiré phenomenon occurring in the 3D image display apparatus according to the related art to which an inclined parallax barrier is applied.
Figure 5:
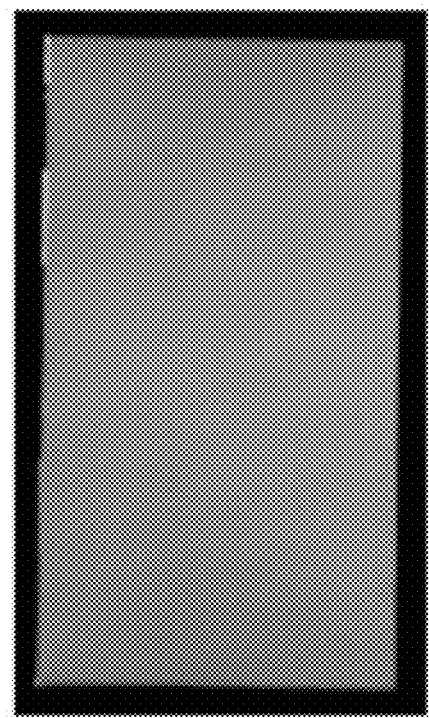

Hereinafter, advantages and features of the present invention, and methods of achieving the same will be clearly understood with reference to the accompanying drawings and the following detailed embodiments. However, the present invention is not limited to the embodiments to be disclosed, but may be implemented in various different forms. The embodiments are provided in order to complete the present invention and fully explain the scope of the present invention for those skilled in the art to which the present invention belongs. The scope of the present invention is defined by the appended claims. Like reference numerals indicate like components throughout the specification. The term "and/or" includes any and all combinations of one or more referents.

The terms used herein are provided to only describe embodiments of the present invention and not for purposes of limitation. Unless the context clearly indicates otherwise, the singular forms include the plural forms. It will be understood that the terms "comprise" or "comprising" when used herein, specify some stated components, steps, operations and/or elements, but do not preclude the presence or addition of one or more other components, steps, operations and/or elements.

Unless otherwise defined, all terms (including technical and scientific terms) used herein can be used as is customary in the art to which the present invention belongs. Also, it will be further understood that terms, such as those defined in commonly used dictionaries, will not be interpreted in an idealized or overly formal sense unless expressly so defined herein.

In addition, when embodiments of the present invention are described, if it is determined that detailed descriptions of known technology related to the present invention unnecessarily obscure the subject matter of the present invention, detailed descriptions thereof will be omitted. Some terms described below are defined by considering functions in the present invention and meanings may vary depending on, for example, a user or operator's intentions or customs. Therefore, the meanings of terms should be interpreted based on the scope throughout this specification.

Figure 6:
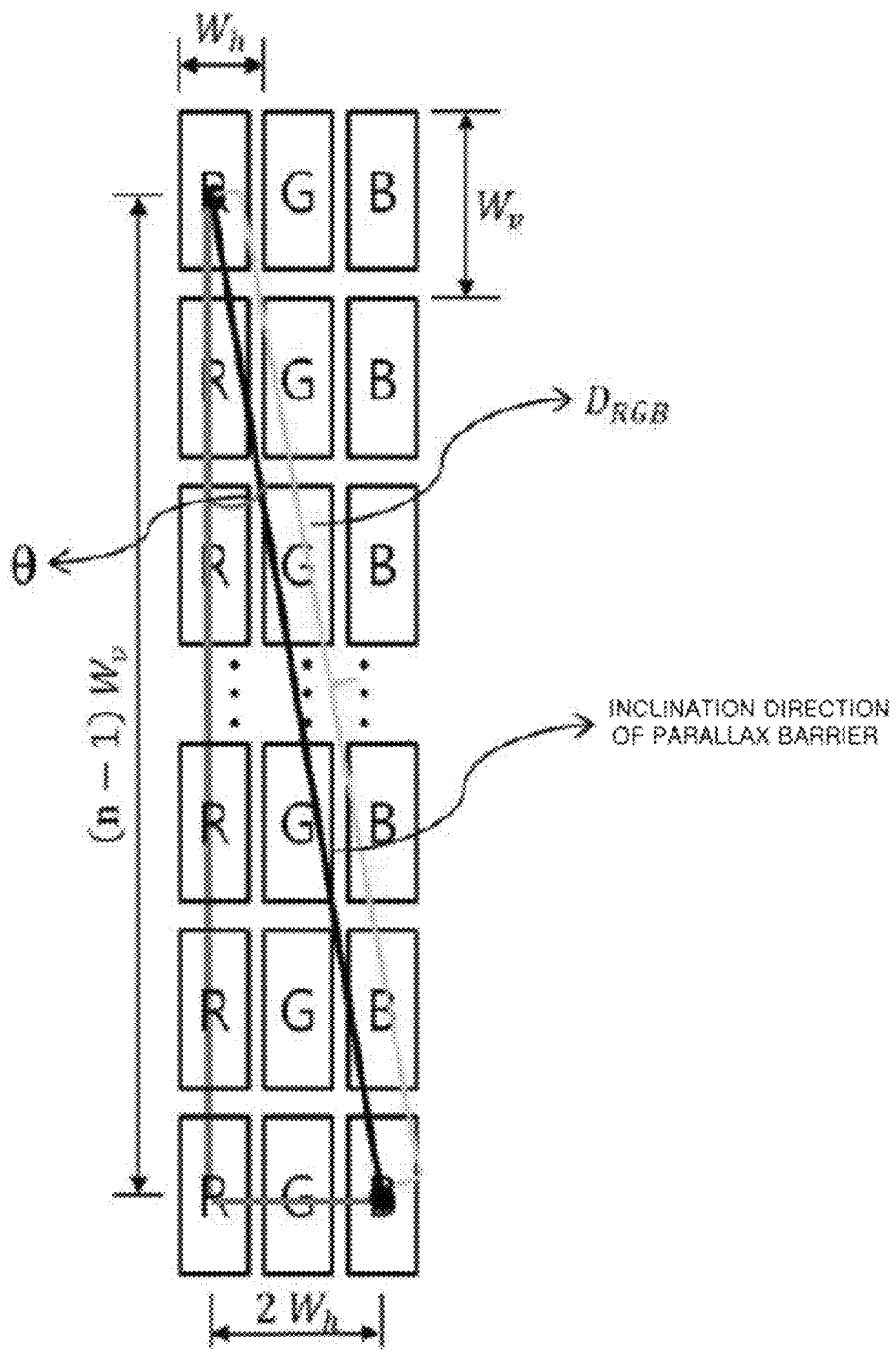
FIG. 6 is a view showing a method of designing viewing zones having a pixel structure according to the related art.

FIG. 6 is a view showing a method of designing viewing zones having a pixel structure according to the related art.

The method of designing the viewing zones having the pixel structure with respect to various inclination angles of a parallax barrier will be described with reference to FIG. 6. In FIG. 6, an inclination angle (θ) of a parallax barrier, that is, an inclination angle (θ) of an optical plate, is an angle of a display panel with respect to a vertical direction. In general, the inclination angle (θ) of the optical plate is expressed by [Equation 1] and a minimum distance between unit RGBs is expressed by [Equation 2].

$$\theta = \tan^{-1}\left[\frac{(3\ W_h)}{W_v}\frac{1}{n}\right]$$ [Equation 1]

$$D_{RGB} = \sqrt{(n-1)^2 W_v^2 + 2^2 W_h^2}$$ [Equation 2]

Here, $W_h$ denotes a horizontal size of a sub-pixel, $W_v$ denotes a vertical size of the sub-pixel, $D_{RGB}$ denotes the minimum distance between the unit RGBs, and n is a real number of 3 or more.

Figure 7:
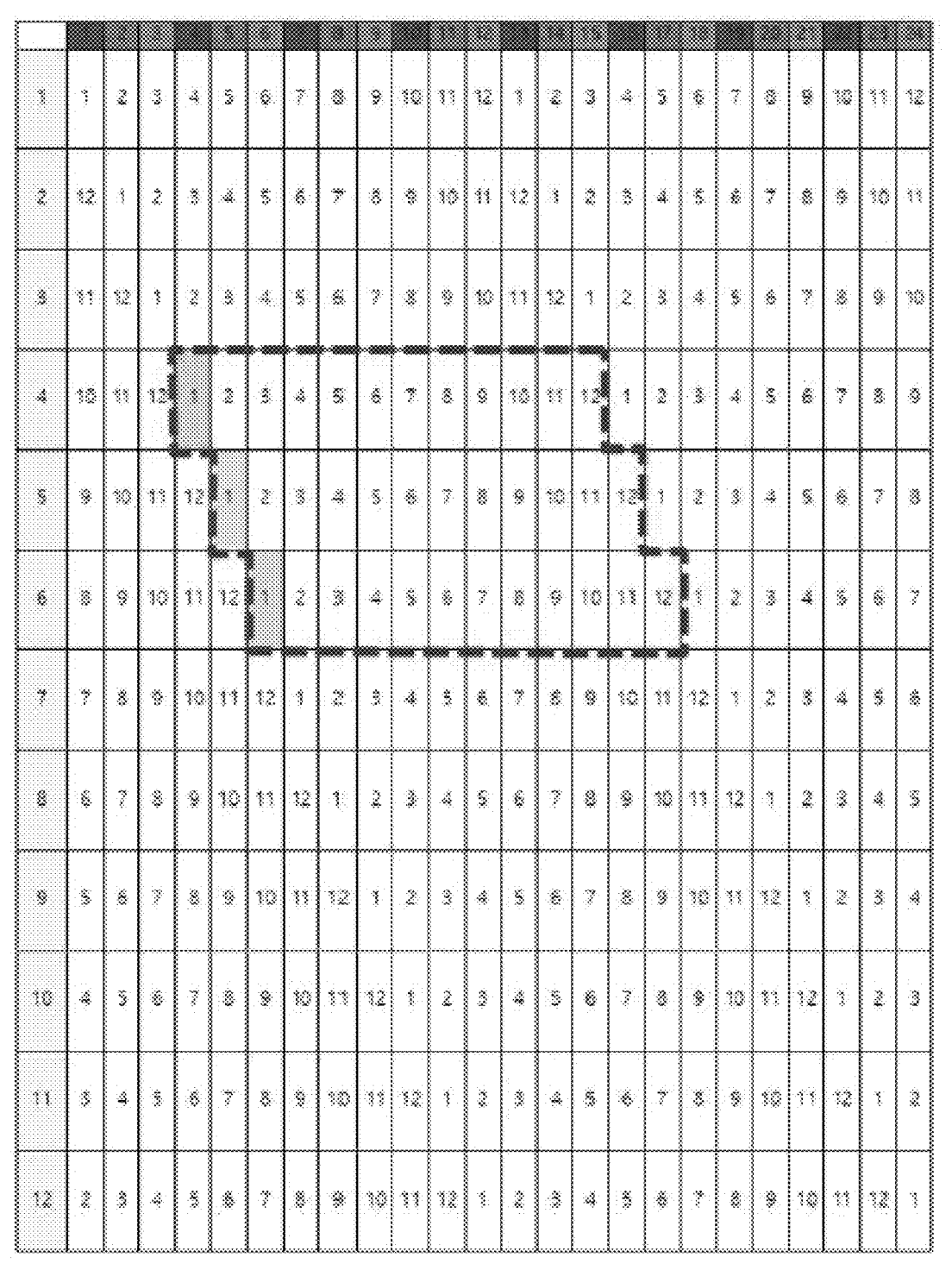
Figure 8:
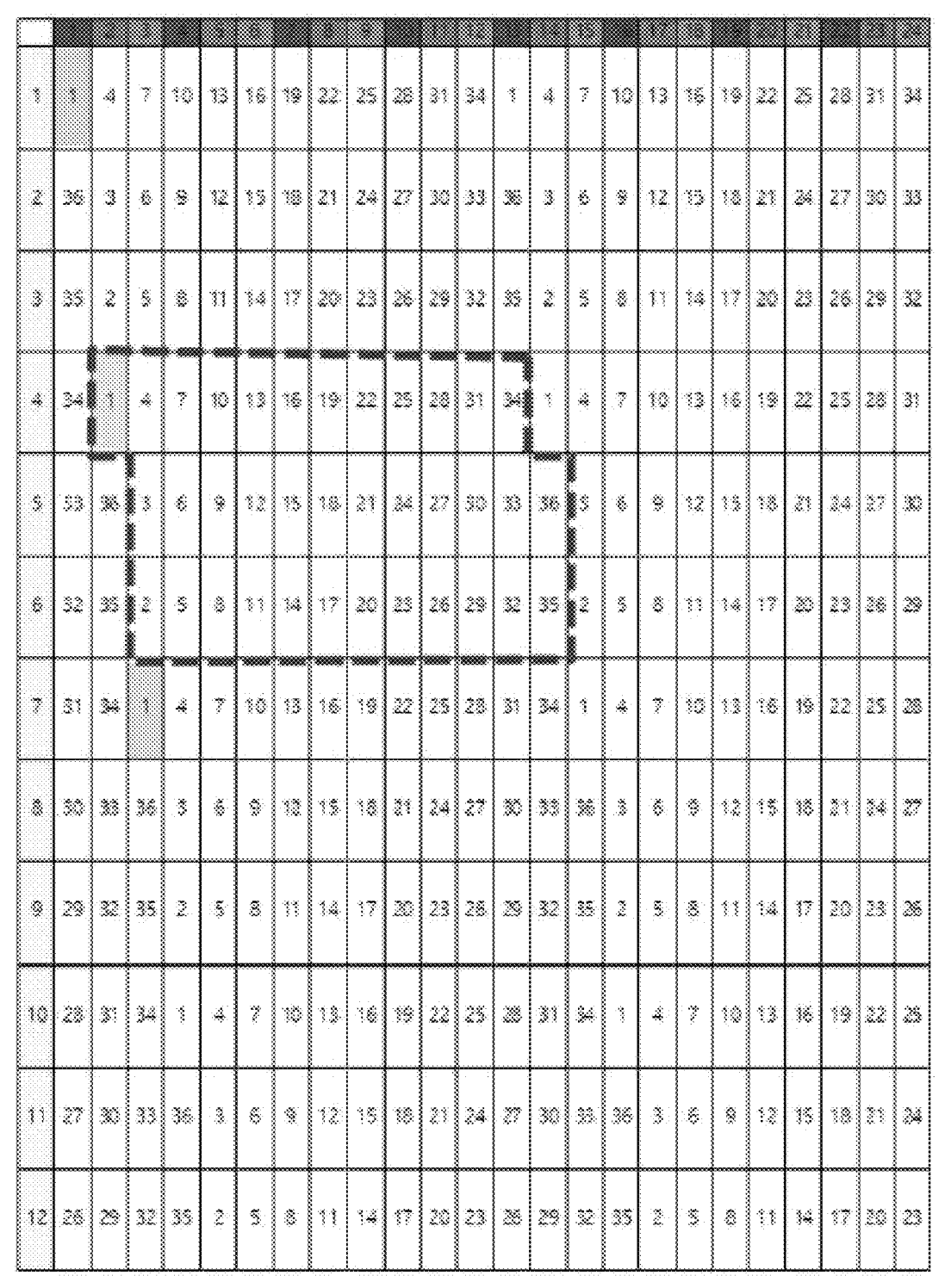
Figure 9:
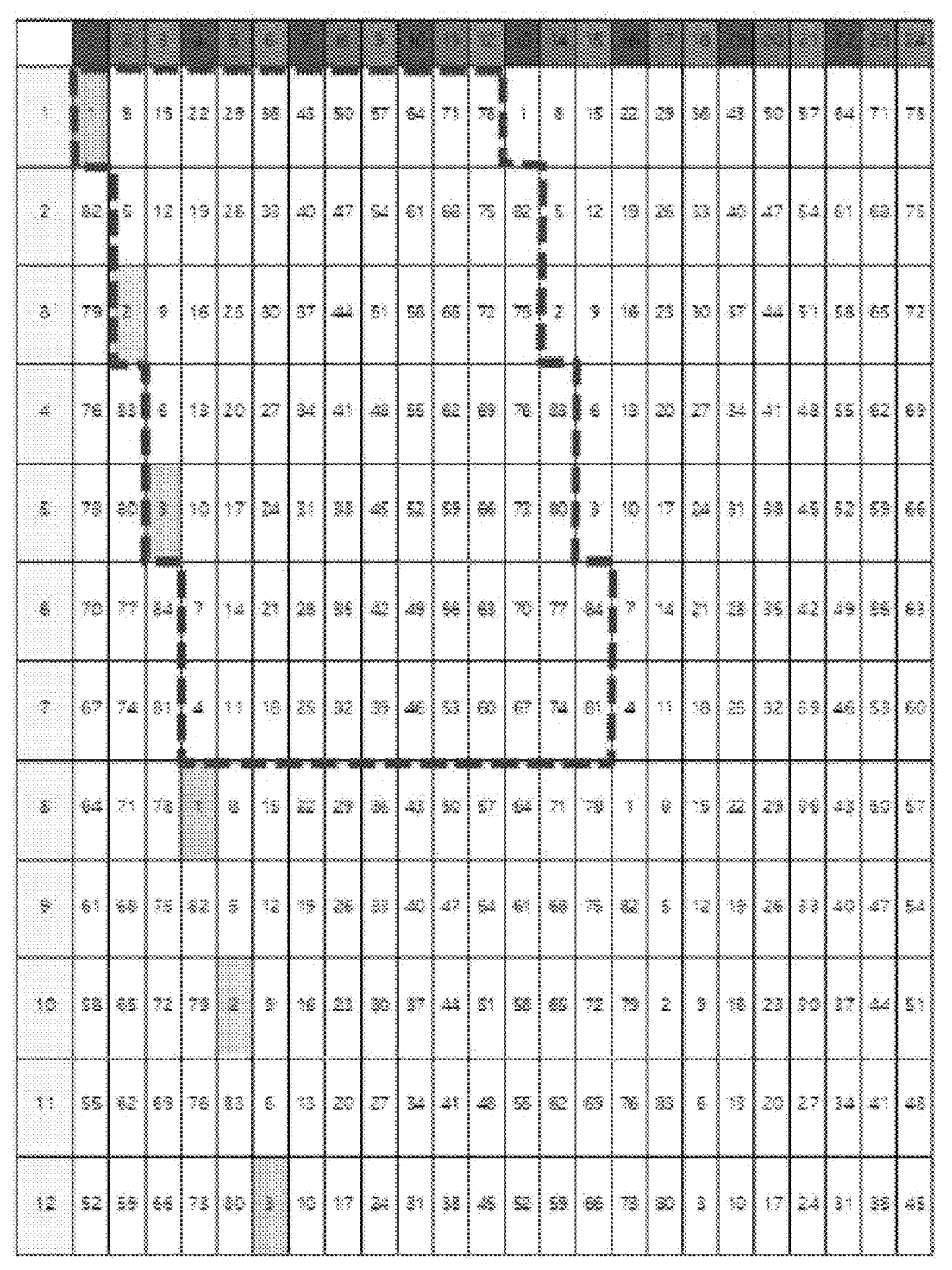

More specifically, referring to FIGS. 7 to 9 showing designs of viewpoints according to an inclination angle of an optical plate in designs of viewing zones having a pixel structure according to the related art, FIGS. 7 to 9 show examples of designs of viewpoints for twelve viewpoints for each data line in a display panel having a general RGB stripe-type sub-pixel structure. FIG. 7 shows viewpoints in a case in which the inclination angle of the optical plate is arcTan(⅓), FIG. 8 shows viewpoints in a case in which the inclination angle of the optical plate is arcTan(⅕), and FIG. 9 shows viewpoints in a case in which the inclination angle of the optical plate is arcTan(1/7). In each of the drawings, a rectangle with a red dotted line represents three-dimensional (3D) image pixel points (a 3D pixel unit), which means one unit including a plurality of viewpoints. FIG. 7 shows color based 3D image pixel points and FIG. 8 shows single-color based 3D image pixel points. Referring to FIGS. 7 and 8 showing a case in which n is a multiple of 3 (n=3m) in the design of the pixel structure, there is an advantage in that viewpoint images having R, G, and B sub-pixels are distributed for each viewpoint, thereby minimizing a chromatic dispersion characteristic. However, it can be seen that a chromatic dispersion effect according to visibility still exists as m increases.

Referring to FIG. 9 showing a case in which n is not a multiple of 3 (n≠3m) in the design of the pixel structure, there is an advantage in that a quantization phenomenon between viewpoints is reduced by increasing the number of inter-viewing zones formed at the same viewpoints for each data line. However, it can be seen that there is a problem in that viewpoint images having a single color sub-pixel are distributed for each viewpoint, thereby increasing a chromatic dispersion effect in an image having a large parallax.

That is, in the method of designing the viewing zones having the pixel structure according to the related art, when a ratio of a horizontal length $W_h$ to a vertical length $W_v$ of the sub-pixel is ⅓ ($W_v$=3%), the inclination angle of the optical plate may be expressed by arcTan(1/n). The inclination angle of the optical plate may be divided into a case in which n is a multiple of 3 (n=3m) and a case in which n is not a multiple of 3 (n≠3m). Here, when n is not a multiple of 3, there is a problem in that a chromatic dispersion effect is significantly exhibited in a viewpoint image having a large depth. Further, in the method of designing the viewing zones having the pixel structure, there is a limitation that a moiré phenomenon may be minimized only within a predetermined range at a specific angle according to a detailed structure of the display panel.

Figure 10:
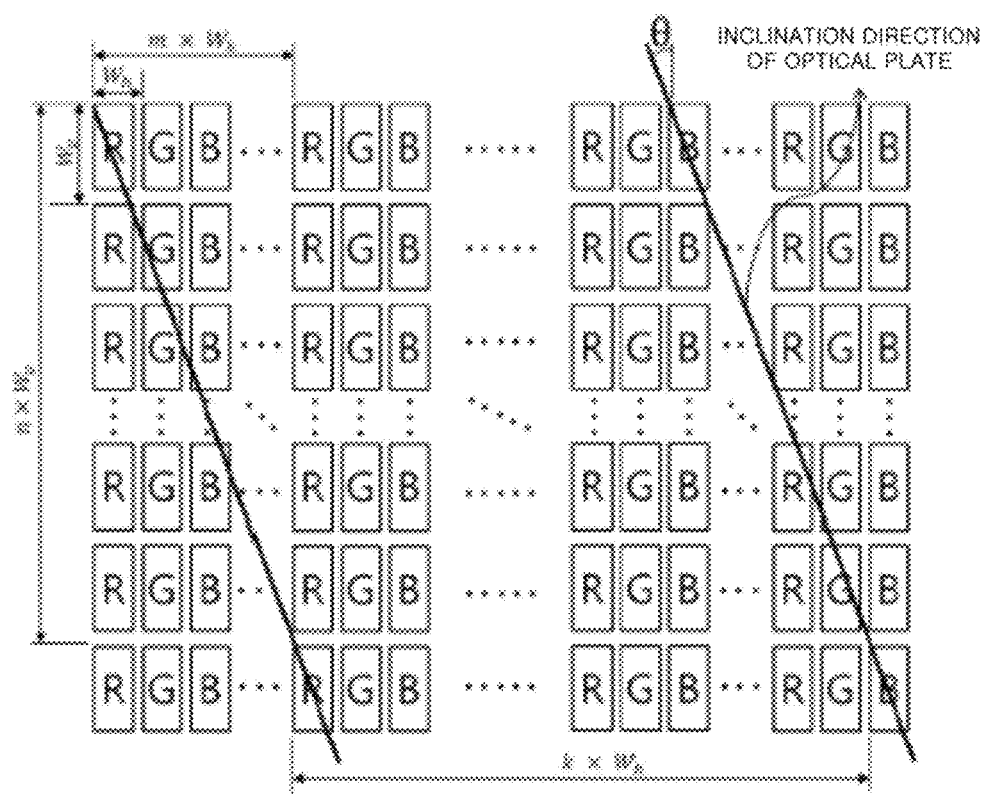
FIG. 10 is a view showing a method of designing sub-pixel based viewing zones according to an embodiment of the present invention.

FIG. 10 is a view showing a method of designing sub-pixel based viewing zones according to an embodiment of the present invention.

Referring to FIG. 10, a autostereoscopic 3D image display apparatus to which the method of designing the sub-pixel based viewing zones according to the embodiment of the present invention is applied includes a display panel including an array of a plurality of sub-pixels, and an optical plate or a line light source, which is spaced a predetermined interval from the display panel. Preferably, in FIG. 10, an inclination angle (θ) of a parallax barrier, that is, an inclination angle (θ) of the optical plate, may be an angle of the display panel with respect to a vertical direction, and the optical plate may be disposed at the inclination angle (θ) expressed by [Equation 3]. In the method of designing the sub-pixel based viewing zones according to the embodiment of the present invention shown in FIG. 10, a case in which m is 4 is given.

$$\theta = \tan^{-1}\left[\frac{W_h}{W_v}\frac{m}{n}\right]$$ [Equation 3]

Here, $W_h$ denotes a horizontal size of the sub-pixel and $W_v$ denotes a vertical size of the sub-pixel. n denotes the number of vertical sub-pixels to which the viewpoint images are distributed, which is an integer of 2 or more and is smaller than the total number of vertical sub-pixels constituting the display panel. m denotes the number of horizontal sub-pixels in one period to which the viewpoint images are distributed, which is an integer of 1 or more and is smaller than n. In this case, m/n is an irreducible fraction. For example, 3/15 is expressed as ⅕, which is an irreducible fraction, and m=1 and n=5.

Preferably, a distance between adjacent viewpoints may be smaller than 65 mm. When the same viewpoint image is provided to both eyes, the viewer may not recognize the same viewpoint image as a 3D image. Therefore, a distance between closest adjacent viewpoints should be smaller than 65 mm, which is an average interval between both eyes, in consideration of vertical inter-viewing zones.

Preferably, for n and m of an equation expressed as [Equation 3], the total number of viewpoints (a total viewpoint number) forming a 3D pixel point formed according to the number (k) of horizontal sub-pixels, which is determined by a horizontal period of the optical plate, may be k×n. That is, the 3D pixel point includes k sub-pixels in a horizontal direction and n sub-pixels in a vertical direction. In [Equation 3], m is a number which determines a degree of inclination when a unit 3D pixel point has a parallelogram shape which is vertically inclined. For example, referring to FIG. 8, a case in which K is 12, n is 3, and m is 1 is given. In this case, the total number of viewpoints constituting the 3D pixel point is 36 (=12×3) viewpoints, and adjacent 3D pixel points in the vertical direction are arranged to be shifted to a right by m (=1) sub-pixels. As another example, referring to FIG. 9, a case in which K is 12, n is 7, and m is 3 is given. In this case, the total number of viewpoints constituting the 3D pixel point is 84 (=12×7) viewpoints, and adjacent 3D pixel points in the vertical direction are arranged to be shifted to a right by m (=3) sub-pixels.

A conventional method of designing a viewing zone in pixel units is expressed by [Equation 4].

$$\theta = \tan^{-1}\left(\frac{3}{W_v}\frac{W_h}{n\prime}\frac{m\prime}{n\prime}\right) \quad \text{[Equation 4]}$$

Here, $W_h$ denotes a horizontal size of the sub-pixel, $W_v$ denotes a vertical size of the sub-pixel, n' denotes the number of vertical sub-pixels to which the viewpoint images are distributed, which is an integer of 2 or more and is smaller than the number of vertical sub-pixels of the display panel, m' denotes the number of horizontal sub-pixels to which the viewpoint images are distributed, which is an integer of 1 or more and is smaller than n' and m'/n' is an irreducible fraction. When n'=n and m'=1, the above equation becomes the same as [Equation 1], which is an equation of a special case in the related art.

Preferably, [Equation 4] may be expressed by [Equation 5] in comparison to [Equation 3] according to the present invention.

$$\theta = \tan^{-1}\left(\frac{W_h}{W_v}\frac{3}{n\prime}\frac{m\prime}{n\prime}\right) \quad \text{[Equation 5]}$$

As shown in [Equation 5], in the conventional method, a denominator of the inclination angle of the optical plate may be adjusted according to an integer in the same manner as the inclination angle of the optical plate according to the present invention, but a numerator may be adjusted only in units of a multiple of 3 (i.e., based on a pixel unit including RGB sub-pixels). On the other hand, both of a numerator and a denominator of the inclination angle of the optical plate according to the present invention may be adjusted according to an integer as shown in [Equation 3]. Therefore, the inclination angle of the optical plate may be finely adjusted at a specific angle at which a moiré phenomenon is minimized.

Preferably, when the number of the horizontal sub-pixels of the optical plate is k and the inclination angle of the optical plate according to the present invention is expressed by [Equation 3], the total number of viewpoints is represented by n×k, and thus the total number of viewpoints increases in proportion to n. The angle at which the moiré phenomenon is minimized may finely vary according to a basic pixel structure of the display panel and design conditions of the optical plate (the parallax barrier or the lenticular lens). In this case, it is necessary to finely adjust the inclination angle of the optical plate, which is a condition for minimizing the moiré phenomenon, and n may be significantly increased according to the inclination angle of the optical plate.

For example, when R, G, and B sub-pixels are arranged in a horizontal direction of the display panel to form a unit pixel and the unit pixel has a square shape, $$\frac{W_h}{W_v} = \frac{1}{3}.$$

Here, when the number (k) of horizontal sub-pixels of the optical plate is designed to be 10 and n=7 and m=2, the total number of viewpoints forming the 3D pixel point becomes 70 (=7×10), and the inclination angle (θ) of the optical plate in this case becomes $$5.44 \text{ degrees} \left(= \tan^{-2}\frac{2}{3\times 7}\right).$$

However, when the inclination angle of the optical plate is finely adjusted as the angle at which the moiré phenomenon is minimized in which n=21 and m=5, the total number of viewpoints becomes 210 (=21×10), and the inclination angle (θ) of the optical plate in this case becomes $$4.54 \text{ degrees} \left(= \tan^{-2}\frac{5}{3\times 21}\right).$$

Alternatively, when the inclination angle of the optical plate is finely adjusted as the angle at which the moiré phenomenon is minimized in which n=35 and m=8, the total number of viewpoints becomes 350 (=35×10), and the inclination angle (θ) of the optical plate in this case becomes $$4.36 \text{ degrees} \left(= \tan^{-1}\frac{8}{3\times 35}\right).$$

That is, even when the inclination angle of the optical plate in which the moiré phenomenon is minimized is experimentally determined according to characteristics of the display panel and the optical plate and the inclination angle of the optical plate shows a deviation of about 1 degree as in the above example, the number of viewpoints is excessively increased three times from n=7 to n=21 or five times from n=7 to n=35, and thus it is difficult to make a viewpoint image. In this case, as in the previous examples, when n=21, the same viewpoint image is provided at three adjacent viewpoints and when n=35, the same viewpoint image is provided at five adjacent viewpoints. Therefore, the inclination angle of the optical plate may match the inclination angle at which the moiré phenomenon is minimized while the total number of viewpoints is 70 as in the case of n=7, and thus it is possible to provide an optimal 3D image.

FIG. 10 shows a generalization of the viewpoint images which are arranged in the sub-pixels according to the inclination angle (θ) of the optical plate expressed by [Equation 3], according to n, m, and k. Referring to FIG. 10, in the display panel on which the R, G, and B sub-pixels are arranged in the horizontal direction, a horizontal width and a vertical width of the sub-pixel are $W_h$ and $W_v$, respectively, and the inclination angle of the optical plate (the parallax barrier or the lenticular lens) is an angle inclined by θ with respect to the vertical direction of the display panel. Further, when the number of the horizontal sub-pixels of the optical plate is k, the inclination angle (θ) of the optical plate is expressed by [Equation 3], the 3D pixel point includes (n×k) sub-pixels, and the number (n×k) of the sub-pixels constituting the 3D pixel point becomes the total number (C) of viewpoints. In this case, the distribution of the viewpoint images of the 3D pixel point for each sub-pixel is determined by [Equation 6] and [Equation 7].

$X[i,j]=1+n\times(j-1)-m\times(i-1)$, if θ>0

$X[i,j]=1+n\times(j-1+m\times(i-1)$, if θ<0  [Equation 6]

$$VP[i,j]=X[i,j], \text{ if } 1 \leq X[i,j] \leq C$$

$$VP[i,j]=X[i,j]-1 \times C, \text{ if } X[i,j] > C$$

$$VP[i,j]=X[i,j]+1 \times C, \text{ if } X[i,j] < 1 \qquad \text{[Equation 7]}$$

Here, 1 is a positive integer selected to satisfy a condition of $1 \leq VP[i,j] \leq C$, VP[i,j] expressed by [Equation 7] denotes a viewpoint number assigned to a sub-pixel in $i^{th}$ row and $j^{th}$ column of the display panel, X[i,j] denotes an intermediate variable for generating the viewpoint number assigned to the sub-pixel in $i^{th}$ row and $j^{th}$ column of the display panel, and X[i,j] denotes an index value for generating the viewpoint number assigned to the sub-pixel in $i^{th}$ row and $j^{th}$ column of the display panel. FIG. 10 shows the inclination angle of the optical plate in the case of $\theta > 0$. In this case, as shown in [Equation 6], the number of viewpoints tends to decrease by m as a row number is increased in the same column. On the other hand, when $\theta < 0$, the number of viewpoints tends to increase by m as the row number is increased in the same column. It can also be seen that the number of viewpoints of the sub-pixels in the same row is increased by n.

Figure 11:
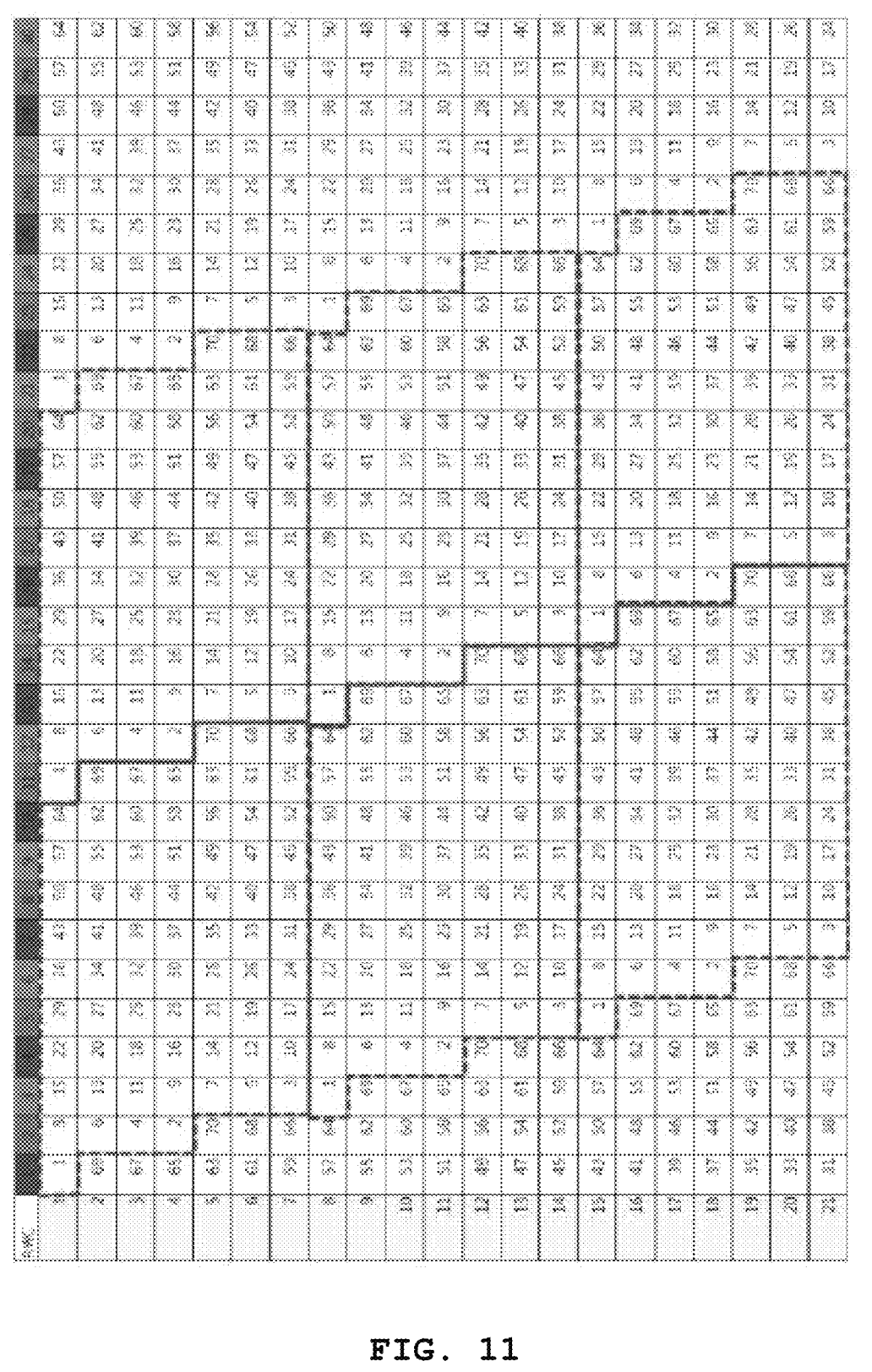

For example, FIG. 11 shows viewpoint numbers of the sub-pixels of the 3D pixel point for each position when the inclination angle ($\theta$) of the optical plate is inclined in a positive direction and n=7, m=2, and k=10, which are arranged on the basis of [Equation 6] and [Equation 7]. In this case, when the pixel composed of the R, G, and B sub-pixels has a square shape (i.e., $3W_h = W_v$), the inclination angle of the optical plate is 5.44 degrees. A region indicated by a red dotted line represents one unit body, that is, a 3D pixel point, including the total number of viewpoints, and a shape of each of the 3D pixel points is a parallelogram shape determined according to the inclined direction of the optical plate (the parallax barrier or the lenticular lens).

Figure 12:
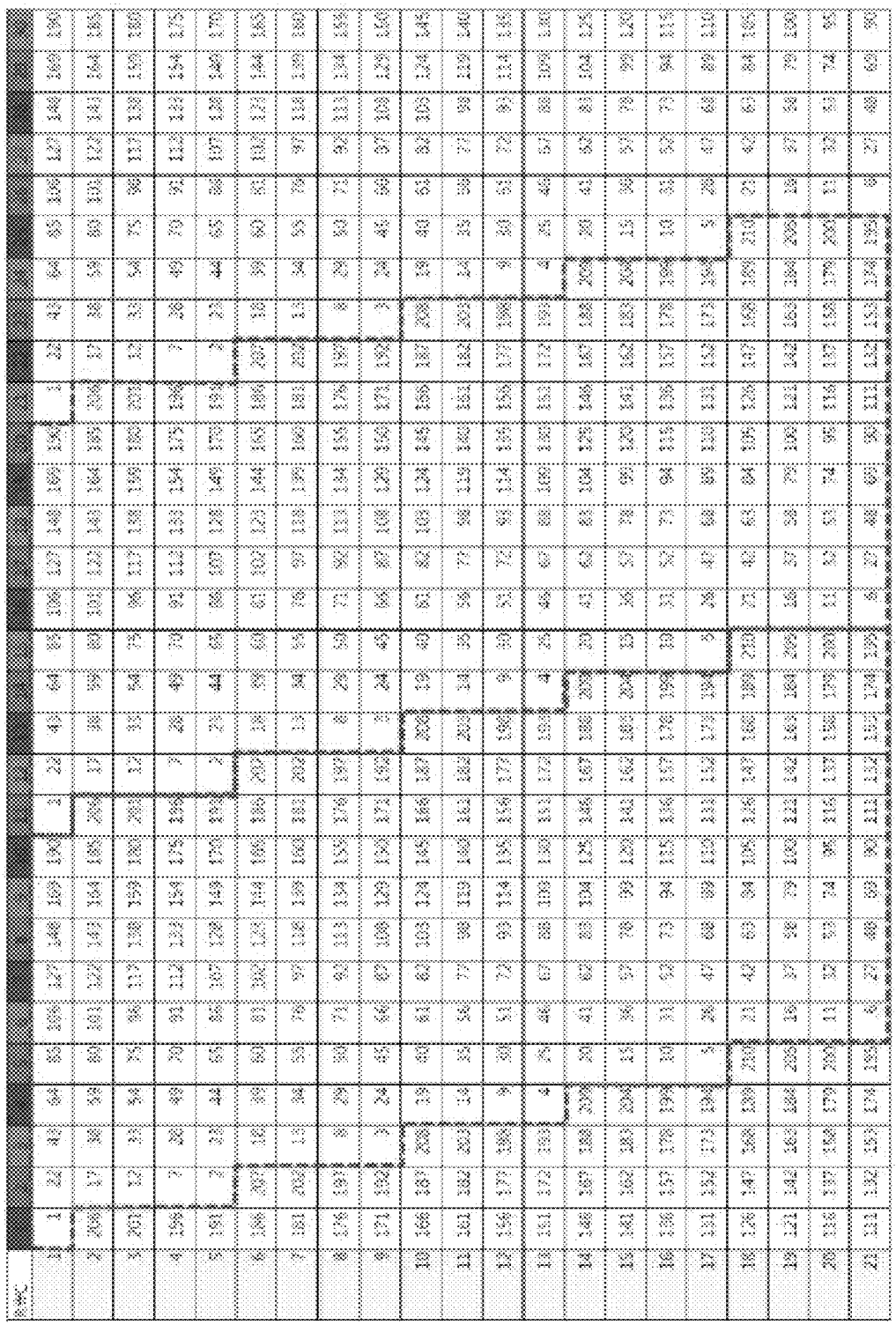

As another example, FIG. 12 shows viewpoint numbers for each sub-pixel when the total number of viewpoints becomes 210, which are arranged by slightly adjusting the inclination angle of the optical plate of FIG. 11. FIG. 12 shows viewpoints in a case in which n=21, m=5, and k=10. When the case is applied to a square-shaped pixel structure composed of horizontal R, G, and B sub-pixels, the inclination angle of the optical plate becomes 4.54 degrees. A 3D pixel point, which is a region indicated by a red dotted line, is composed of 210 sub-pixels, and a viewpoint number is assigned to each of the sub-pixels. In this case, the total number of viewpoints increases by three times as much as when compared with the case of FIG. 11, and thus the number of the sub-pixels composed of the 3D pixel point increases by three times. Specifically, in the case of FIG. 12, each of the 3D pixel points is composed of 10 sub-pixels in a horizontal direction but is composed of 21 sub-pixels in a vertical direction, and thus the total number of viewpoints increases by three times as much in the vertical direction as when compared with the case of FIG. 11. That is, when an angle of the optical plate, which satisfies a condition in which the moiré phenomenon is minimized, corresponds to that of the case of FIG. 12, the number of viewpoints may be increased by three times as much as when compared with the arrangement at the inclination angle of the optical plate in the case of FIG. 11, and thus it may be difficult to generate a viewpoint image. In this case, when the 3D pixel point of FIG. 12 is formed using a method of providing the same viewpoint information to three adjacent viewpoint numbers, the number of viewpoints may be adjusted under a condition of the inclination angle of the optical plate, in which the moiré phenomenon is minimized.

Figure 13:
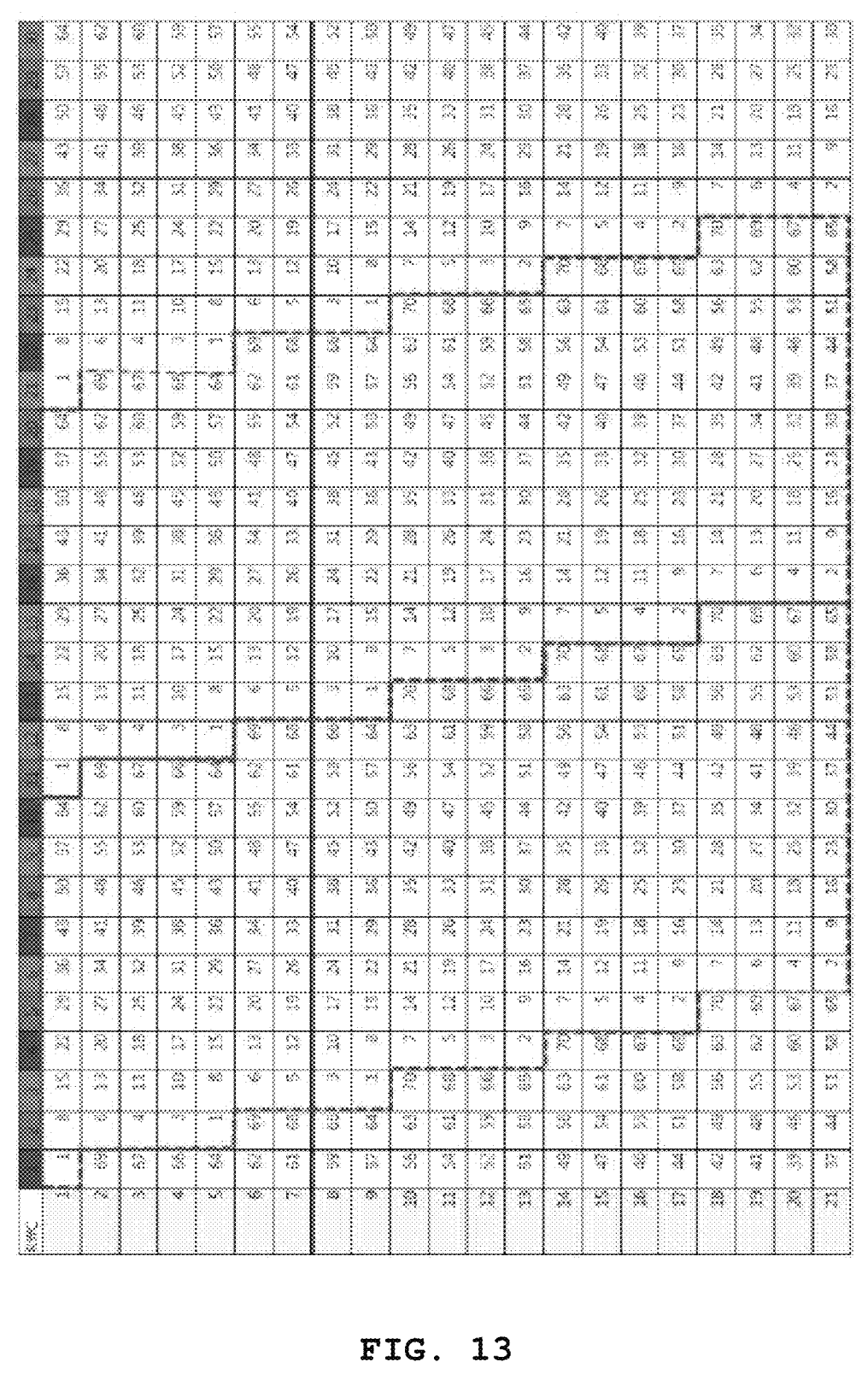

FIG. 13 shows a result obtained by combining three adjacent viewpoints in the arrangement of the viewpoints of FIG. 12 and providing the same viewpoint information to the combined adjacent viewpoints to assign 70 viewpoint numbers to the sub-pixels. When the same viewpoint information is provided to the three adjacent viewpoints in this manner, there is a difference from the arrangement of the sub-pixels into which the viewpoint information in the design providing the original 70 viewpoints are inputted even when the 70 viewpoints are provided in both cases in the same manner. That is, in comparison of the case of FIG. 11 to the case of FIG. 13, in the case of FIG. 11, the 3D pixel point is composed of seven sub-pixels in a vertical direction and 10 sub-pixels in a horizontal direction, and thus 70 viewpoints are arranged thereto. On the other hand, in the case of FIG. 13, the same viewpoint is arranged at three adjacent viewpoints, there are three sub-pixels in which the 3D pixel point is composed of 21 sub-pixels in the vertical direction and 10 sub-pixels in the horizontal direction, and the same viewpoint is arranged in the 3D pixel point. However, in consideration of 3D pixel points adjacent thereto, intervals between the sub-pixels arranged at the same viewpoint may not be the same. In the above example, the method of assigning the same viewpoint to three adjacent points has been described, but the number of the adjacent viewpoints to which the same viewpoint is assigned may be variously changed. In this manner, the same viewpoint may be assigned to the adjacent viewpoints and the total number of viewpoints actually used may be adjusted.

Figure 14A:
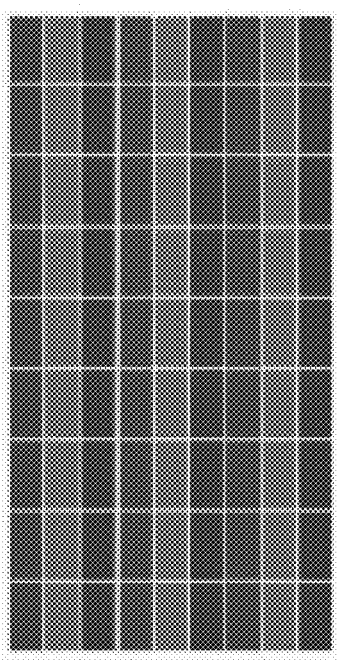
FIGS. 14A to 14C are views showing types of panels to which designs of viewpoints according to an inclination angle of an optical plate in designs of sub-pixel based viewing zones may be applied.
Figure 14B:
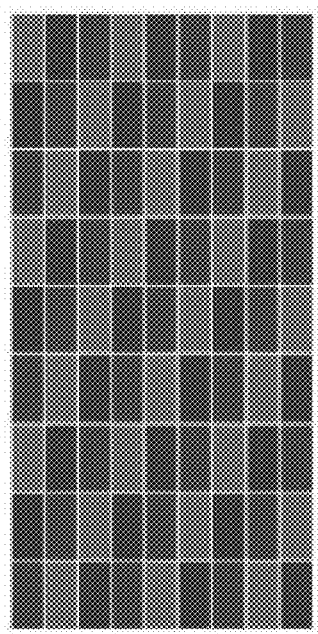
Figure 14C:
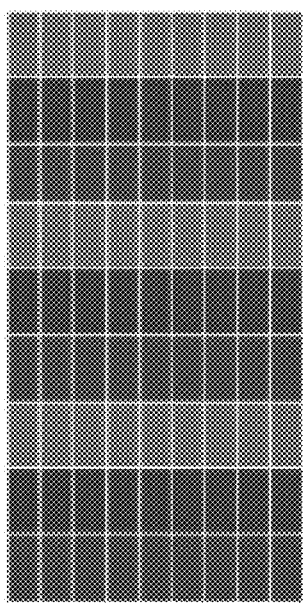

FIGS. 14A to 14C are views showing types of panels to which designs of viewpoints according to an inclination angle of an optical plate in designs of sub-pixel based viewing zones may be applied.

Referring to FIG. 14A, a panel is an RGB stripe-type panel, which is a panel type applied to the description of the embodiment of the present invention with reference to FIGS. 11 to 13.

Referring to FIG. 14B, a panel is a delta RGB type panel in which a structure of RGB sub-pixels is changed for each data row. Referring to FIG. 14C, a panel is an RGB type panel for each data row, in which R, G, and B sub-pixels are arranged for each data row. The designs of the viewpoints according to the inclination angle of the optical plate in the designs of the sub-pixel based viewing zones according to the present invention may be applied to both of the types of the panels shown in FIGS. 14B and 14C.

Although the embodiments of the autostereoscopic 3D image display apparatus according to the present invention have been described above, the present invention is not limited thereto, but may be variously modified and embodied within the scope of the claims, detailed description and accompanying drawings, and this also belongs to the present invention. For example, the autostereoscopic 3D image display apparatus according to the present invention may include an optical plate or a line light source, which is spaced apart from the display panel on which pixels are arranged. Although not shown in the drawings, a controller may generate a 3D image by arranging viewpoint images on the display panel.

As described above, according to the present invention, since a degree of freedom capable of applying various angles of an optical plate in which a moiré phenomenon is minimized is increased, an amount of crosstalk is reduced and a method of disposing the optical plate is flexible (a degree of freedom of an inclination angle including a right angle) to adjust a ratio of a horizontal resolution to a vertical resolution, using such a degree of freedom, a color mixing phenomenon does not occur, and thus the moiré phenomenon can be fundamentally eliminated.

In addition, a autostereoscopic 3D image display apparatus can be used for applications (e.g., 3D monitors, 3D notebooks, 3D TVs, and smart phones) that use a autostereoscopic 3D display (an auto-stereoscopic display).

That is, according to the present invention, it is possible to facilitate a design of a viewing zone optimized for various types of display panels, thereby providing design convenience, a high-resolution display can be used to optimize characteristics (minimized crosstalk and a continuous motion parallax) of the viewing zone of a high-density multi-viewpoint 3D display to which an optical plate (a parallax barrier or a lenticular lens) or a line light source is applied, an inclination angle of the optical plate or the line light source for each display panel in which the moiré phenomenon is minimized can be precisely adjusted and designed, and thus the moiré phenomenon can be minimized.

What is claimed is:

1. An autostereoscopic three-dimensional image display apparatus comprising:
  a display panel including an array of a plurality of sub-pixels; and
  an optical plate or a line light source, which is spaced a predetermined interval from the display panel at a predetermined inclination angle,
  wherein an inclination angle of the optical plate or the line light source with respect to a vertical direction of the display panel is determined by the following [Equation]:

$$\theta = \tan^{-1}\left[\frac{W_h}{W_v}\frac{m}{n}\right]$$ [Equation]

here, θ denotes the inclination angle, $W_h$ denotes a horizontal size of each of the sub-pixels constituting the display panel, $W_v$ denotes a vertical size of each of the sub-pixels, n denotes the number of vertical sub-pixels, to which viewpoint images are distributed, among the sub-pixels constituting the display panel, which is an integer of 2 or more and is smaller than the number of the vertical sub-pixels of the display panel, and m denotes the number of horizontal sub-pixels, to which the viewpoint images are distributed, in one period among the sub-pixels constituting the display panel, which is an integer of 1 or more and is smaller than n.

2. The autostereoscopic three-dimensional image display apparatus of claim 1, further comprising a controller configured to generate a three-dimensional image by arranging the viewpoint images on the display panel.

3. The autostereoscopic three-dimensional image display apparatus of claim 2, wherein a distance between adjacent viewpoint images among the viewpoint images is 65 mm or less.

4. The autostereoscopic three-dimensional image display apparatus of claim 2, wherein the controller determines a viewpoint image to be arranged in the sub-pixel according to the following [Equation] when the inclination angle is greater than 0 degrees:

$X[i,j]=1+n\times(j-1)-m\times(i-1)$, and [Equation]

determines a viewpoint image to be arranged in the sub-pixel according to the following [Equation] when the inclination angle is smaller than 0 degrees:

$X[i,j]=1+n\times(j-1)+m\times(i-1)$ [Equation]

here, X[i,j] denotes an index value for generating a viewpoint number assigned to a sub-pixel in $i^{th}$ row and $j^{th}$ column.

5. The autostereoscopic three-dimensional image display apparatus of claim 4, wherein the controller determines a final viewpoint number to be assigned in the sub-pixel by adjusting the determined viewpoint image,
  wherein the final viewpoint number is determined by the following [Equation] when the determined viewpoint image is 1 or more and is a total number of viewpoints or less:

$VP[i,j]=X[i,j]$, [Equation]

the final viewpoint number is determined by the following [Equation] when the determined viewpoint image is greater than the total number of viewpoints:

$VP[i,j]=X[i,j]-l\times C$, and [Equation]

the final viewpoint number is determined by the following [Equation] when the determined viewpoint image is smaller than 1:

$VP[i,j]=X[i,j]+l\times C$, [Equation]

here, VP[i,j] denotes a final viewpoint number assigned to the sub-pixel in $i^{th}$ row and $j^{th}$ column, X[i,j] denotes the index value for generating the viewpoint number assigned to the sub-pixel in $i^{th}$ row and $j^{th}$ column, C denotes the total number of viewpoints at which the viewpoint image is arranged, and l is a positive integer selected to satisfy a condition of $1\leq VP[i,j]\leq C$.

6. The autostereoscopic three-dimensional image display apparatus of claim 2, wherein the controller arranges the same viewpoint image at a predetermined number of adjacent viewpoints when the number of viewpoints increases by adjusting the inclination angle of the optical plate or the line light source.

7. The autostereoscopic three-dimensional image display apparatus of claim 1, wherein the optical plate includes a parallax barrier or a lenticular lens.

* * * * *